United States Patent [19]
Twyman

[11] Patent Number: 5,651,259
[45] Date of Patent: Jul. 29, 1997

[54] METHOD AND APPARATUS FOR FILLING VEHICLE FLUID RESERVOIR

[75] Inventor: Benjamin E. Twyman, Ormand Beach, Fla.

[73] Assignee: Condenseco, Inc., Daytona Beach, Fla.

[21] Appl. No.: 575,457

[22] Filed: Dec. 20, 1995

[51] Int. Cl.$^6$ .................................................. F25D 17/02
[52] U.S. Cl. ................................ 62/93; 62/188; 62/285; 62/288
[58] Field of Search ........................ 62/272, 285, 286, 62/288, 289, 291, 188, 92, 93

[56] References Cited

U.S. PATENT DOCUMENTS

| | | |
|---|---|---|
| 1,993,684 | 3/1935 | Rogers . |
| 3,242,952 | 3/1966 | Austin . |
| 3,352,353 | 11/1967 | Stevens et al. . |
| 4,748,821 | 6/1988 | Berenter ................................ 62/289 |
| 4,979,377 | 12/1990 | Fievet et al. ........................... 62/288 |
| 5,024,383 | 6/1991 | Vaschetto et al. . |
| 5,118,040 | 6/1992 | Abe . |
| 5,183,099 | 2/1993 | Bechu . |
| 5,327,613 | 7/1994 | Ohtsu . |

Primary Examiner—John M. Sollecito
Attorney, Agent, or Firm—Niro, Scavone, Haller & Niro

[57] ABSTRACT

A method and apparatus are described for retrieving condensed fluid from an air conditioner in a vehicle, storing the collected fluid for subsequent use, and transferring the retrieved fluid to a reservoir in the vehicle. The method and apparatus described allow manual distribution or automatic distribution of the fluid.

5 Claims, 2 Drawing Sheets

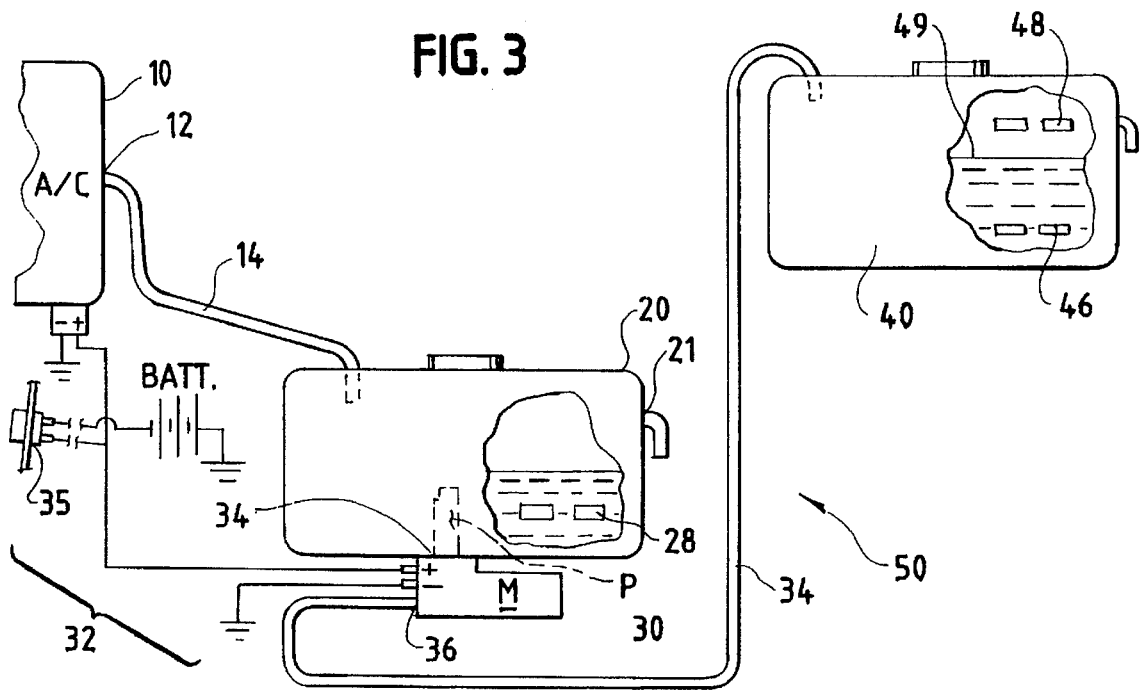
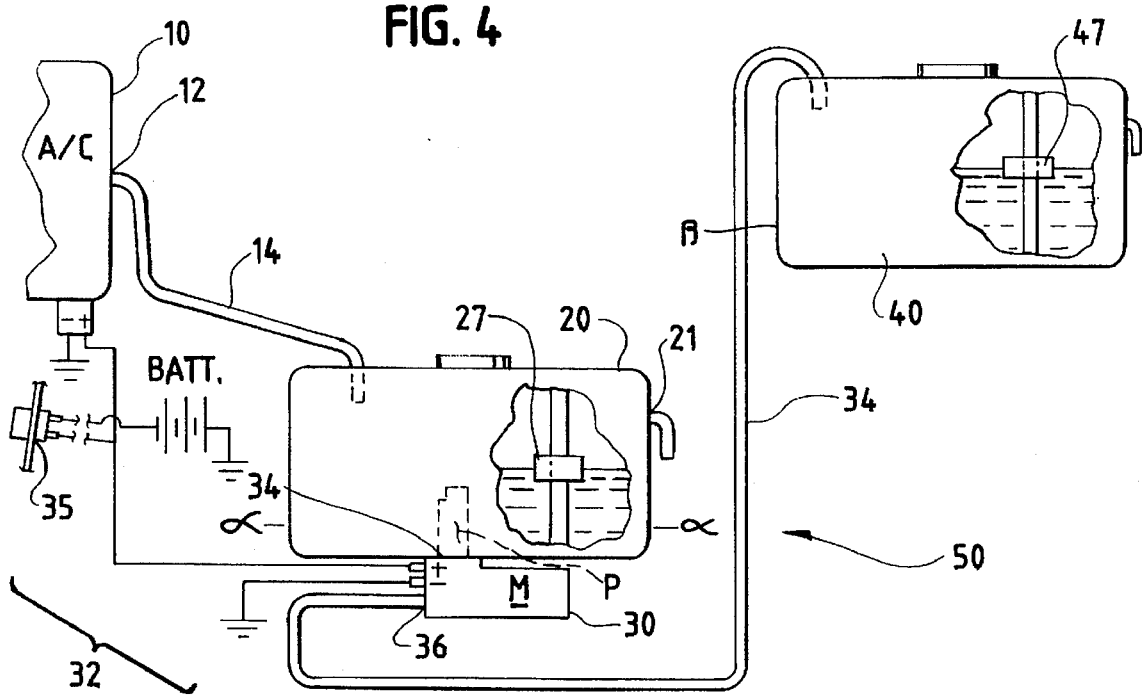

METHOD AND APPARATUS FOR FILLING VEHICLE FLUID RESERVOIR

BACKGROUND OF THE INVENTION

The present invention relates generally to fluid reservoirs and, more specifically, to a system which collects condensed fluid and uses the collected fluid to fill a fluid reservoir in a vehicle.

All modern automobiles have fluid reservoirs for windshield wiper fluid, radiator overflow and the like. These reservoirs, of course, require re-filling occasionally as the fluid in the reservoir is depleted. In some cases, running out of fluid in the automobile reservoirs can be very inconvenient and, occasionally, dangerous. Anyone driving behind another automobile kicking up dirt and debris knows that windshield wiper fluid is essential to staying on the road. Similarly, anyone with an overheated radiator on a deserted stretch of highway understands frustration.

A device and method for helping to prevent premature emptying of a reservoir and for prolonging periods between refills would help prevent those situations and be very beneficial.

SUMMARY OF THE INVENTION

The present invention provides a simple, inexpensively constructed and operated device and method for collecting fluid from a continuous source and distributing it to a reservoir. The present invention utilizes a system which takes advantage of water which condenses on an air conditioner of a vehicle. As water condenses from the vehicle's air conditioning system, the system of the present invention collects that water, which would otherwise drip away, and routes it to the various reservoirs of the vehicle or to a central reservoir to be distributed, as needed, to other reservoirs of the vehicle. As can be appreciated, the fluid source may be located at a height below that of the reservoir. The present invention accommodates this scenario by providing a pump and electrical operational means to transfer the water to the higher elevation.

A primary object of the present invention is to provide a system and method of collecting condensed fluid and routing the collected fluid to a reservoir.

Another object of the present invention is to provide an apparatus for collecting fluid from a vehicle air conditioner and routing the fluid to a reservoir to be further routed from the reservoir at the discretion of the user.

A still further object of the present invention is to provide a relatively inexpensive fluid collection and distribution apparatus easily adaptable and installable for use with most vehicles.

Another object of the present invention is to provide a manually actuatable fluid collection and distribution apparatus to be selectively employed by a vehicle operator to distribute fluid to a vehicle fluid system.

An additional object of the present invention is to provide an automatic fluid collection and distribution apparatus to automatically, without the need for manual intervention, collecting condensed fluid from a vehicle air conditioner and routing the fluid to a reservoir to be further automatically routed from the reservoir when needed.

DESCRIPTION OF THE DRAWINGS

FIG. 3 is a diagrammatical view of another embodiment of the present invention.

FIG. 4 is a diagrammatical view of another embodiment of the present invention.

DETAILED DESCRIPTION OF THE PREFERRED EMBODIMENT

Figure 1:
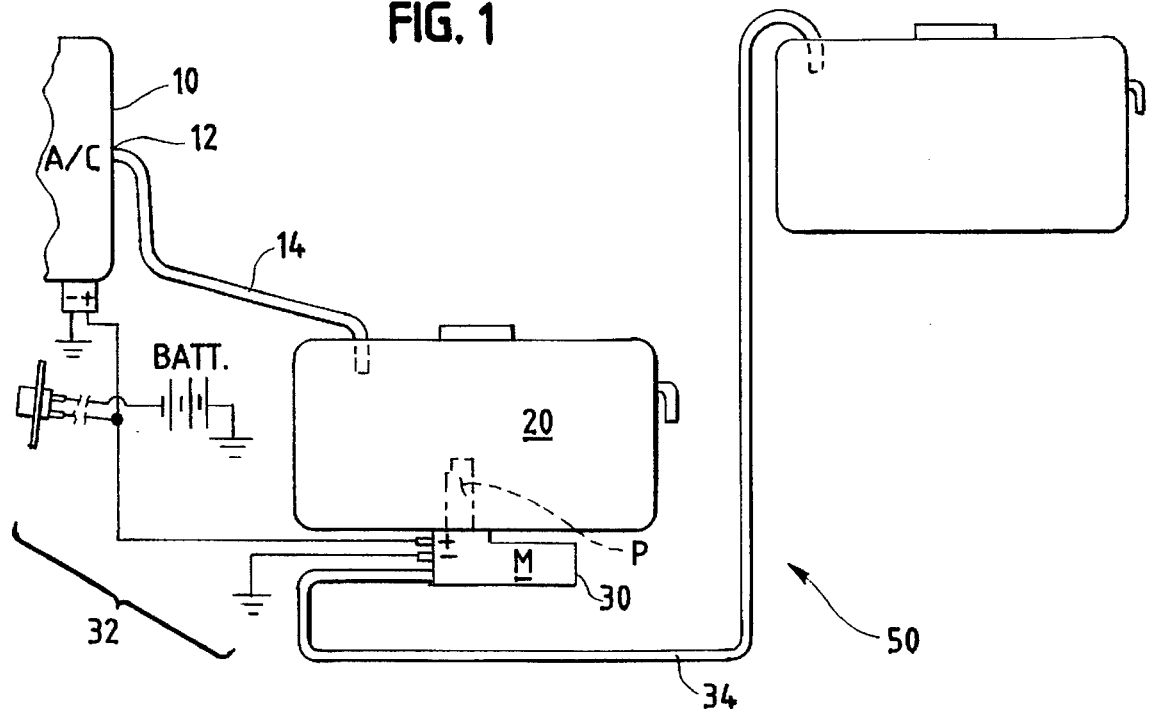
FIG. 1 is a diagrammatical view of one embodiment of the present invention.
Figure 2:
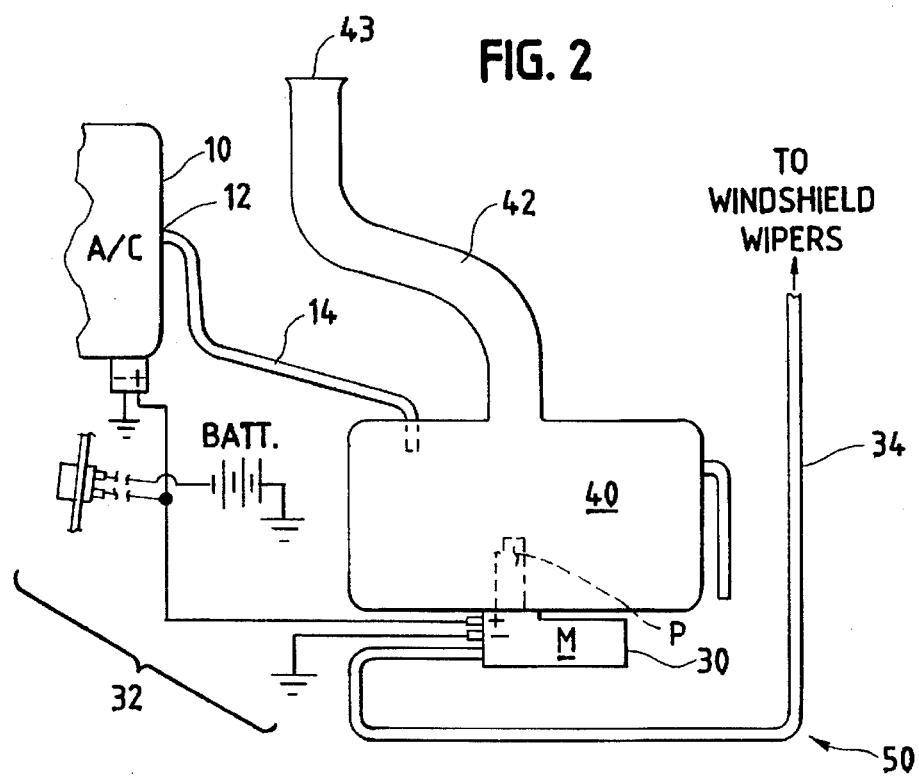
FIG. 2 is a diagrammatical view of another embodiment of the present invention.

As shown in FIGS. 1 and 2, and designated generally 50, the fluid collection and distribution system of the present invention comprises a vehicle air conditioner 10 having a condensation outlet 12, a condensation conduit 14, central reservoir 20, pump 30, pump control means 32, and fluid distribution conduit 34.

As a vehicle air conditioner 10 cools the interior of a vehicle, it continuously compresses and cools a cooling medium, usually freon or the like. As it does so, water condenses from the air conditioner. In humid climates, where air conditioning is desired most, the condensation volume is substantial. An air conditioner will, thus, have a condensation outlet to discharge the condensed fluid and provides an excellent continuous fluid source.

As seen in FIGS. 1 through 4, and designated generally 50, the present invention provides air conditioner 10, central reservoir 20 attached to the vehicle (not shown), pump 30 and pump operation means 32, and destination reservoir 40. Air conditioner 10 has condensed fluid outlet 12. Flexible tube 14 forms a fluid conduit between condensed fluid outlet 12 and central reservoir 20. Central reservoir 20 resides below outlet 12 so that fluid exiting air conditioner 10 flows via gravity to central reservoir 20. To compensate for the situation where central reservoir 20 is over-filled prior to its contents being needed, central reservoir 20 has overflow aperture 21 near its upper end so that fluid can freely and automatically overflow after the fluid reaches the height of aperture 21.

In fluid communication with central reservoir 20 is pump 30 having inlet 32 and outlet 33. Pump inlet 32 communicates with reservoir 20 at the lowermost point of reservoir 20. Pump 30 is preferably a 12-volt DC pump. Pump 30 is preferably wired to be operated via a push-button switch 35. Any suitable push-button switch, as is well known to those of ordinary skill in the art, is suitable as is a toggle switch or similar device. Push-button switch 35 is mounted on a vehicle dashboard or other location inside the vehicle in convenient proximity to the vehicle operator. Switch 35 thus allows the vehicle operator to selectively operate pump 30 to distribute fluid from central reservoir 20 to other destinations.

Flexible tube 34 extends from pump outlet 33 to windshield wiper fluid reservoir 40, forming a fluid conduit therebetween. Pump 30 can thus be operated to selectively distribute fluid from central reservoir 20 to wiper fluid reservoir 40 or other reservoir (not shown).

In an alternative embodiment, as best shown in FIG. 2, flexible tube 14 in fluid communication with air conditioner outlet 12 extends directly to windshield wiper reservoir 40. In this embodiment, wiper fluid reservoir 40 includes a fluid conduit 42 having opening 43 situated at a convenient location accessible to a vehicle operator such that the vehicle operator can access opening 43 of conduit 42 to add detergent or antifreeze or the like to wiper fluid reservoir 40.

In operation, referring to FIG. 1, air conditioner 10 produces fluid through condensation which travels through outlet 12 and tube 14 to central reservoir 20. Reservoir 20 stores the fluid until needed. If air conditioner 10 produces a greater volume of fluid than reservoir 20 can hold, excess fluid will simply exit reservoir 20 via overflow aperture 21. When a vehicle operator desires fluid to be distributed from central reservoir 20, for instance when no fluid remains in the windshield wiper reservoir or when the radiator overheats, he or she may operate switch 35 inside the vehicle to distribute fluid where needed. Activating switch 35 operates pump 30 in fluid communication with central reservoir 20. Fluid collected in central reservoir 20 is thus pumped through conduit 34 to a windshield wiper reservoir 40 or the like. The present invention thus greatly reduces the need to refill a windshield wiper reservoir and to monitor the contents of the reservoir.

In another embodiment, as shown in FIG. 3, pump 30 may have alternate actuation means. In this embodiment, a dedicated destination reservoir 40 is equipped with electronic switches 46 and 48, each of which may be hydroelectrically activated. Lower switch 46 is mounted near a low point of dedicated reservoir 40. Upper switch 48 is mounted near an upper point of dedicated reservoir 40. Lower switch 46 is activated to turn pump 30 on when its circuit is closed by fluid level 49 in reservoir 40 dropping below switch 46. Pump 30 is thus activated to pump fluid from central reservoir 20 to dedicated reservoir 40. Pump 30 will operate until the fluid level reaches upper switch 48. When fluid reaches upper switch 48, electrical connection is made, thus causing the circuit to turn off pump 30. Furthermore, central reservoir 20 is equipped with master switch 28 mounted at a low point on central reservoir 20. If the fluid level of central reservoir 20 is below master switch 28, pump 30 is disabled and will not be turned on by dedicated reservoir switch 46. In this embodiment, the vehicle operator will rarely have to ever concern himself or herself with the fluid in the reservoirs. The system of the present invention will electronically, automatically replenish the fluids as they are depleted.

In a further preferred embodiment, as shown in FIG. 4, a mechanical-electrical automated distribution system is provided. In this embodiment, fluid is collected into central reservoir 20 with pump 30 in fluid communication as described in the immediately preceding embodiment. In lieu of hydroelectric switches 28, 46, and 48, however, in this embodiment float-type switches as are well known in the industry are employed. In this embodiment, central reservoir 20 includes first float switch 27 positionally responsive to the central reservoir fluid level and in electrical communication with pump 30. First float 27 operates as a switch such that it will provide an enabling electrical connection to pump 30 when it is above a predetermined height α in central reservoir 20. When float 27 drops below height α, the electrical circuit is broken, thus disabling pump 30. A second reservoir 40 is equipped with a second float switch 47. Second float switch 47 is in electrical communication with pump 30 and ascends and descends with the fluid level of second reservoir 40. Second float 47 causes an electrical current to flow to pump 30 when second float 47 descends below a predetermined height β. This electrical current activates pump 30 when pump 30 is enabled. Pump 30 will pump fluid from central reservoir 20 to second reservoir 40 until second float 47 ascends with the second reservoir fluid level to a predetermined height τ. When second float 47 reaches height τ, float 47 terminates the electrical current to pump 30, thus de-activating pump 30.

Specific embodiments of the condensate removal system according to the present invention have been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the invention disclosed and claimed herein.

What is claimed is:

1. A system for retrieving condensed fluid from a vehicle air conditioner and transferring that fluid to a reservoir comprising:

an air conditioner on which fluid condenses when operated and having a condensed fluid outlet;

a central reservoir in fluid communication with the air conditioner outlet and having an overflow port;

a pump having an inlet and an outlet, the inlet being in fluid communication with the contents of the reservoir and having actuating means; and a conduit extending from the pump outlet to a second reservoir;

and means operable by an occupant of said vehicle for selectively distributing said condensed fluid from the central reservoir to the second reservoir via the pump actuating means.

2. A method for collecting and distributing condensed fluid from a vehicle air conditioner and transferring that fluid to a destination reservoir comprising the steps of:

condensing fluid from a vehicle air conditioner;

flowing the condensed fluid through a conduit;

collecting the condensed fluid in a central reservoir for future distribution;

placing pump means in fluid communication with the central reservoir;

placing pump actuation means in convenient proximity to an operator of the vehicle whereby the pump actuation means is selectively actuatable by said operator to distribute fluid from the central reservoir;

pumping the fluid from the central reservoir to a second reservoir.

3. A system for retrieving condensed fluid from a vehicle air conditioner and automatically distributing the fluid to a reservoir comprising:

an air conditioner on which fluid condenses and having a condensed fluid outlet;

a central reservoir in fluid communication with the air conditioner outlet and having an overflow port;

a pump having an inlet and an outlet, the inlet being in fluid communication with the contents of the central reservoir and having automatic actuating means;

a conduit extending from the pump outlet to a second reservoir;

the pump automatic actuating means comprising a first master hydroelectric switch located near the bottom of the central reservoir which enables or disables the pump in response to the fluid level in the central reservoir, a second hydroelectric switch located near the bottom of the second reservoir which activates the pump, if enabled, when the fluid level falls below the level of the second switch, and a third hydroelectric switch located near the top of the second reservoir which deactivates the pump when the fluid level reaches the level of the third switch.

4. A system for retrieving condensed fluid from a vehicle air conditioner and automatically distributing the fluid to a reservoir comprising:

an air conditioner on which fluid condenses and having a condensed fluid outlet;

a central reservoir in fluid communication with the air conditioner outlet and having an overflow port;

a pump having an inlet and an outlet, the inlet being in fluid communication with the contents of the central reservoir and having automatic actuating means;

the pump automatic actuating means comprising a first float switch disposed in the central reservoir positionally responsive to the fluid level in the central reservoir in electrical communication with the pump such that the pump will be electrically disabled when the first float is below a predetermined level, and a second float switch disposed in the second reservoir positionally responsive to the fluid level in the second reservoir in electrical communication with the pump such that the second float switch will cause the pump to be activated, if not disabled, when the second float switch descends below a predetermined level and cause the pump to be de-activated when the second float switch ascends above a predetermined level.

5. A system for retrieving condensed fluid from a vehicle air conditioner and automatically distributing the fluid to a reservoir comprising:

an air conditioner on which fluid condenses and having a condensed fluid outlet;

a central reservoir in fluid communication with the air conditioner outlet and having an overflow port;

a pump having an inlet and an outlet, the inlet being in fluid communication with the contents of the central reservoir and having automatic actuating means;

means for enabling the pump while the fluid level in the central reservoir is above a predetermined height and disabling the pump when the fluid level is below the predetermined height; and means for activating the pump when the pump is enabled and the fluid level of the second reservoir is below a second predetermined height and for de-activating the pump when the fluid level in the second reservoir reaches a third predetermined height.

* * * * *